United States Patent [19]

Kamo et al.

[11] Patent Number: 5,294,338
[45] Date of Patent: Mar. 15, 1994

[54] POROUS POLYETHYLENE HOLLOW FIBER MEMBRANE OF LARGE PORE DIAMETER, PRODUCTION PROCESS THEREOF, AND HYDROPHILIZED POROUS POLYETHYLENE HOLLOW FIBER MEMBRANES

[75] Inventors: Jun Kamo; Takayuki Hirai; Hiroshi Takahashi; Kenji Kondo, all of Hiroshima, Japan

[73] Assignee: Mitsubishi Rayon Co., Ltd., Tokyo, Japan

[21] Appl. No.: 853,777

[22] PCT Filed: Nov. 28, 1991

[86] PCT No.: PCT/JP91/01638
§ 371 Date: Jun. 9, 1992
§ 102(e) Date: Jun. 9, 1992

[87] PCT Pub. No.: WO92/09359
PCT Pub. Date: Jun. 11, 1992

[30] Foreign Application Priority Data

Nov. 28, 1990 [JP] Japan .................. 2-327279
Jun. 7, 1991 [JP] Japan .................. 3-162354

[51] Int. Cl.$^5$ ............................................. B01D 69/08
[52] U.S. Cl. ............................ 210/321.8; 210/321.89; 210/500.25; 210/500.36; 264/41
[58] Field of Search ........ 264/235, 41, 45.1, DIG. 48, 264/DIG. 62; 210/321.6, 321.72, 321.78–321.81, 321.87–321.9, 500.23, 500.36

[56] References Cited

U.S. PATENT DOCUMENTS 4,530,809 7/1985 Shindo et al. .................. 264/235
4,696,748 9/1987 Nitadori et al. .

FOREIGN PATENT DOCUMENTS 050399 4/1982 European Pat. Off. .
0203459 5/1986 European Pat. Off. .
3821591 1/1989 Fed. Rep. of Germany .
57-42919 3/1982 Japan .
61-271003 12/1986 Japan .
63-190602 8/1988 Japan .

Primary Examiner—Frank Sever
Attorney, Agent, or Firm—Oblon, Spivak, McClelland, Maier & Neustadt

[57] ABSTRACT

Disclosed is a porous polyethylene hollow fiber membrane of large pore diameter which have (a) rectangular pores formed by microfibrils that are oriented in the lengthwise direction of the fibers and joint portions that are composed of stacked lamellae, the pores being contiguous with each other from the inner wall surface to the outer wall surface of the hollow fiber membrane to form a stacked, multicellular structure, (b) an average pore diameter ranging from greater than 2 μm up to 10 μm as measured with a mercury porosimeter, (c) a porosity of 75 to 95%, and (d) an air permeability of not less than $8 \times 10^5$ $1/m^2 \cdot hr \cdot 0.5$ atm. This hollow fiber membrane can be produced by melt-spinning polyethylene, annealing the resulting unstretched hollow fiber under specific conditions, and then cold-stretching and hot-stretching the annealed hollow fiber under specific conditions.

21 Claims, 2 Drawing Sheets

10μm

POROUS POLYETHYLENE HOLLOW FIBER MEMBRANE OF LARGE PORE DIAMETER, PRODUCTION PROCESS THEREOF, AND HYDROPHILIZED POROUS POLYETHYLENE HOLLOW FIBER MEMBRANES

TECHNICAL FIELD

This invention relates to porous polyethylene hollow fiber membranes having a large pore diameter and a high porosity and hence suitable for use in fields of application requiring a very high filtering flux, such as precision filtration and air cleaning, a process for the production of such hollow fiber membranes, and hydrophilized porous polyethylene hollow fiber membranes.

BACKGROUND ART

Porous hollow fiber membranes consisting of polyethylene and having a membrane structure formed from stacked rectangular pores are conventionally known, and the details thereof are disclosed, for example, in Japanese Patent publication Nos. 35726/'88 and 42006/'88. It is disclosed in the former that, when a high-density polyethylene having a melt index of 1 to 15 and a density of 0.960 g/cm$^3$ or greater is melt-spun at a spinning draft of 1,000 to 10,000, the spun hollow fibers are cold-stretched at a stretching speed of not less than 50% per second, and the cold-stretched hollow fibers are hot-stretched at a temperature of 80 to 125° C. until a total amount of stretching of 400 to 700% is attained, the resulting porous hollow fiber membranes have characteristic rectangular pores, an average pore diameter of 0.5 to 2 μm as measured with a mercury porosimeter, a porosity of 30 to 90% by volume, and a blue dextran rejection of less than 90%. However, the average pore diameters of the porous hollow fiber membranes described in the Examples of this patent are at most 0.82 μm. In Japanese Patent Publication No. 42006/'88, it is disclosed that, when polyethylene is melt-spun at a spinning draft of greater than 2,000 with a spinning cylinder, 5 to 30 cm long, installed beneath the spinneret, and the spun hollow fibers are stretched until a total amount of stretching of 100 to 400% is attained, the resulting porous hollow fiber membranes have a water permeability of 100 to 2,000 l/m$^2$·hr·760 mmHg, a human serum albumin permeability of not less than 30%, and a blue dextran rejection of not less than 90%. Thus, the hollow fiber membranes provided by the latter patent have a smaller pore diameter than those provided by the former patent.

Moreover, it is disclosed in Japanese Patent Laid-Open No 86902/'86 that porous hollow fiber membranes having pore diameter of 0.1 to 1.0 μm are produced by forming pores according to the stretching method. These porous hollow fiber membranes are characterized by the fact that the microfibrils oriented in the lengthwise direction of the fibers are broken to a substantial degree. Thus, the pore diameter is increased by breaking the microfibrils to expand the rectangular pores in the lateral direction. As a matter of actual fact, however, the resulting porous hollow fiber membranes have a pore diameter of at most 10 μm.

Furthermore, a hydrophilic composite porous membrane consisting of a porous matrix formed of a polyolefin and a coating layer formed of an ethylenevinyl alcohol copolymer is disclosed in Japanese Patent Laid-Open No. 271003/'86. It is described in the claims of this patent that its average pore diameters is within the range of 0.02 to 4.0 μm. With respect to pore diameter, however, the technique disclosed in this hydrophilic composite porous membrane never exceeds the technical level of the aforementioned Japanese Patent Laid-Open Nos. 35726/'88 and 86902/'86. In fact, the hollow fiber membranes obtained in the Examples of that patent have an average pore diameter of 0.25 to 0.70 μm.

Thus, porous hollow fiber membranes consisting of polyethylene and having rectangular pores whose average diameter exceeds 1.0 μm have not been available in the prior art.

Generally, porous membranes are broadly divided into hydrophilic membranes and hydrophobic membranes according to the properties of the material. Known examples of hydrophilic porous membranes include cellulose, cellulose derivatives, polyvinyl alcohol, ethylenevinyl alcohol copolymers and the like. Hydrophilic porous membranes are characterized by the fact that, since the pore surfaces thereof are hydrophilic, they are easily wettable with water and permit the filtration of aqueous solution without any special pretreatment.

However, hydrophilic membranes have the disadvantage that, when they are in the wet state, they show a reduction in mechanical strength and that they undergo a high degree of swelling with water. Moreover, hydrophilic membranes have the additional disadvantage that, when they are dried from the wet state, they are reduced in membrane properties and are liable to deteriorate.

On the other hand, when hydrophobic porous membranes are used as they are, water cannot easily permeate therethrough. Accordingly, a hydrophilizing treatment is required in order to enable hydrophilic liquids including water to permeate therethrough. A variety of methods have been studied especially in connection with hydrophilization by surface modification of polyolefin membranes. It is to be noted, however, that hydrophilizing methods which have been proposed for film-like materials having smooth surfaces cannot be simply applied to the hydrophilization of porous membranes having complex surface configurations.

Well-known methods for hydrophilizing porous polyolefin membranes include the organic solvent wetting and water substituting method in which the entire surfaces, inclusive of pore surfaces, of a porous polyolefin membrane are subjected to a wetting treatment with an organic solvent having good miscibility with water, such as an alcohol and ketone, followed by substitution of water for the organic solvent; the physical adsorption method in which a hydrophilic material such as polyethylene glycol or a surfactant is adsorbed on the surfaces of a porous membrane to impart hydrophilicity to the porous membrane (Japanese Patent Laid-Open Nos. 153872/'79 and 24732/'84); and the chemical surface modification methods in which a hydrophilic monomer is held on the surfaces of a porous film and then exposed to radiation (Japanese Patent Laid-Open No. 38333/'81) or a porous structure consisting of a hydrophobic resin is subjected to a plasma treatment (Japanese Patent Laid-Open No. 157437/'81).

In the organic solvent wetting and water substituting method, however, it is necessary to keep water around the porous membrane at all times and, therefore, its handling is troublesome. The reason for this is that, once water is lost from pores during storages or use, the part having such water-free pores regains hydrophobicity and no longer permits the permeation of water therethrough. Although the physical adsorption method is simple in operation, the hydrophilic material may come off while the porous membrane is used for a long period of time. Therefore, this method cannot be regarded as a fully satisfactory hydrophilizing method. Moreover, the conventional chemical surface modification methods are also disadvantageous. Whether a porous membrane is exposed to radiation or subjected to a plasma treatment, it is difficult to hydrophilize the membrane uniformly in the direction of its thickness. If it is attempted to effect uniform hydrophilization over the entire thickness of a porous membrane which has a large thickness or is in the form of hollow fibers, the matrix of the porous membrane is unavoidably damaged or reduced in mechanical strength.

It has also been proposed to hydrophilize a hydrophobic porous membrane by previously treating it with a saponification product of an ethylene-vinyl acetate copolymer, i.e., an ethylene-vinyl alcohol copolymer (Japanese Patent Laid-Open Nos. 125408/'86 and 271003/'86).

It has also been proposed to produce hydrophilic porous hollow fiber membranes having hydrophilized pore surfaces, by melt spinning a blend of two different polymers, stretching the spun fibers to cleave the interfaces between the different polymers, and then subjecting the resulting microporous hollow fibers to an aftertreatment such as hydrolysis or sulfonation of the sidechain groups present in the constituent polymers (Japanese Patent Laid-Open No. 137208/'80).

In addition, there have been proposed porous polyolefin membranes having a hydrophilic polymer held firmly on the pore surfaces thereof, and a production process thereof (Japanese Patent Laid-Open No. 190602/'88). More specifically, this patent provides hydrophilic porous membranes comprising porous polyolefin membranes having a hydrophilic crosslinked polymer, which is composed of monomers including diacetone acrylamide and a crosslinkable monomer, held on at least a part of the pore surfaces thereof. Such hydrophilic porous membranes can be produced by holding monomers including diacetone acrylamide and a crosslinkable monomer on at least a part of the pore surfaces of a porous polyolefin membrane, and then polymerizing them by the application of heat.

However, since all of these methods use a conventional porous polyolefin membrane as the starting material, the performance of the resulting hydrophilized porous membranes is insufficient for fields of application requiring a high permeation flow rate. That is, in order to obtain a hydrophilized porous membrane having a high permeation flow rate, an increase in the pore diameter and porosity of the starting hydrophobic porous membrane needs to be considered in combination with hydrophilization.

In the fields of precision filtration and air cleaning which require a very high filtering flux, membranes and nonwoven fabrics having a pore diameter of the order of microns and a high porosity are being used. Porous hollow fiber membranes having rectangular pores are characterized by the fact that, as described in Japanese Patent Publication No. 35726/'88, they have high permeability to gases and liquids and they are less liable to clogging because of their membrane structure formed from stacked rectangular pores. However, the performance of such porous hollow fiber membranes having rectangular pores is still insufficient for fields of application requiring a very high filtering flux and a low pressure loss, such as bacteria-free and dust-free air filters, dust-removing filters for various gases, and sterile water filters. The reason for this is that their pore diameter is too small and their porosity is too low for use in such fields.

On the other hand, hydrophilizing treatment with an alcohol or a surfactant provides only temporary hydrophilization. Moreover, if a porous membrane having such a hydrophilizing agent attached thereto is used for filtering or other purposes, the alcohol or surfactant migrates to and contaminates the purified water. Accordingly, it is necessary to wash off the hydrophilizing agent thoroughly before use. On this occasion, the pore surfaces regain hydrophobicity if the porous membrane is dried. Thus, once the porous membrane is hydrophilized, it is necessary to replace the hydrophilizing agent with water and thereby keep its pore surfaces in contact with the water at all times.

The method descried in Japanese Patent Laid-Open No. 38333/'81 can provide permanent hydrophilization, because the groups developing hydrophilicity are chemically fixed to the porous membrane. However, the need of exposure to ionizing radiation requires large-scale equipment, provides rather low process stability, and involves a risk of causing damage to the membrane material. Thus, it is difficult to manage and control the process steps.

In the method described in Japanese Patent Laid-Open No. 137208/'80, the hollow fiber membranes produced by melt-spinning a blend of different polymers and then stretching the spun fibers to make them porous generally have a low porosity. Moreover, this method requires an after-treatment for hydrophilization, such as hydrolysis or sulfonation, which makes the process complicated.

Moreover, even if the technique of Japanese Patent Laid-Open No. 38333/'81 is applied to the hollow fiber membranes of Japanese Patent Publication No. 35726/'88, the resulting hydrophilized hollow fiber membranes have only a submicron pore diameter. With respect to pore diameter, the techniques disclosed in the hydrophilic composite porous membranes of Japanese patent Laid-Open Nos. 125408/'86 and 271003/'86 never exceed the technical level of the aforementioned Japanese Patent Publication No. 35726/'88 or the like. In fact, the hollow fiber membranes obtained in the Examples of those patents had an average pore diameter of 0.25 to 0.70 $\mu$m.

Furthermore, Japanese Patent Laid-Open No. 190602/'88 discloses hydrophilic porous membranes comprising porous polyolefin membranes having a hydrophilic crosslinked polymer, which is composed of monomers including diacetone acrylamide and a crosslinkable monomer, held on the pore surfaces thereof.

However, the performance of these porous membranes having a crosslinked polymer held on the surfaces of rectangular pores is still insufficient for fields of application requiring a very high filtering flux and a low pressure loss, such as the filtration of aqueous solutions and aqueous suspensions, the preparation of purified water for use in electronic industry and the like, and the sterilization of raw water for use in the manufacture of pharmaceutical preparations. The reason for this is that its pore diameter is too small and its porosity is too low for use in such fields. If permanent hydrophilicity could be imparted to a porous hollow fiber membrane exhibiting a membrane structure formed from stacked rectangular pores capable of providing excellent filtering efficiency and, moreover, having a large pore diameter and a high porosity, great contributions would be made to frontier industrial fields through achievement of energy saving and creation of an ultraclean environment.

DISCLOSURE OF THE INVENTION

It is an object of the present invention to provide a porous polyethylene hollow fiber membrane which exhibits a membrane structure formed from stacked rectangular pores, has a high porosity and a large pore diameter, and can achieve a high air permeability.

It is another object of the present invention to provide a porous polyethylene hollow fiber membrane which exhibits permanent hydrophilicity and has a high porosity and a large pore diameter.

According to one aspect of the present invention, there is provided a porous polyethylene hollow fiber membrane of large pore diameter which consists of polyethylene, the hollow fiber membrane having:

(a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;

(b) an average pore diameter ranging from greater than 2 μm up to 10 μm as measured with a mercury porosimeter;

(c) a porosity of 75 to 95%; and (d) an air permeability of not less than $8 \times 10^5$ l/m²·hr·0.5 atm.

According to another aspect of the present invention, there is provided a process for the production of a porous polyethylene hollow fiber membrane of large pore diameter having the above-described properties which comprises the steps of melt-spinning polyethylene with a nozzle for forming hollow fibers, annealing the resulting unstretched hollow fiber, and then cold-stretching and hot-stretching the annealed hollow fiber to make it porous, the process being characterized in that the unstretched hollow fiber is annealed at a temperature of 100° to 130° C. for 30 minutes or more, the deformation rate during hot stretching is not greater than 10% per second, and the total amount of stretching is within the range of 750 to 2,500%.

According to still another aspect of the present invention, there is provided a hydrophilized porous polyethylene hollow fiber membrane comprising the above-described porous polyethylene hollow fiber membrane of large pore diameter having a saponification product of an ethylene-vinyl acetate copolymer held on at least a part of the pore surfaces thereof.

According to a further aspect of the present invention, there is provided a hydrophilized porous polyethylene hollow fiber membrane comprising the above-described porous polyethylene hollow fiber membrane of large pore diameter having a hydrophilic crosslinked polymer held on at least a part of the pore surfaces thereof, the hydrophilic crosslinked polymer being formed by polymerizing monomers including diacetone acrylamide and a crosslinkable monomer.

BEST MODE FOR CARRYING OUT THE INVENTION

Figure 1:
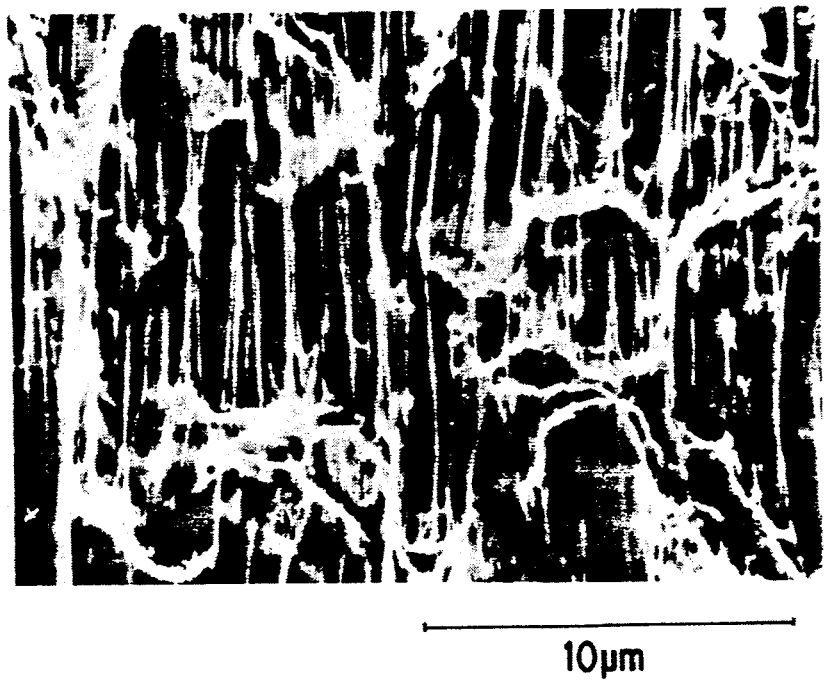
FIG. 1 is a scanning electron photomicrograph illustrating the fibrous structure of the outer wall surface of a porous polyethylene hollow fiber membrane of large pore size in accordance with the present invention.

The polyethylene used in the present invention preferably comprises a high-density polyethylene having few branches. When measured according to the procedure described in ASTM D-1505, its density is preferably 0.960 g/cm³ or greater and more preferably 0.965 g/cm³ or greater. By melt-spinning this polyethylene under specific conditions and then stretching the spun hollow fibers under specific conditions, there are obtained porous hollow fiber membranes of large pore diameter in which pores are contiguous with each other from the inner wall surface to the outer wall surface of the hollow fiber membrane.

The polyethylene used in the present invention preferably has a melt index (MI) of 0.05 to 6.0 as measured according to the procedure described in ASTM D-1238. More preferably, the melt index is within the range of 0.1 to 5.5. If a polyethylene having a melt index of greater than 6.0 is used, it is difficult to stretch the spun fibers until a total amount of stretching of 750% or greater is attained, and it is consequently difficult to obtain a porous hollow fiber membrane having a large pore diameter and a high porosity in accordance with the present invention. If a polyethylene having a melt index of less than 0.05 is used, its melt viscosity is so high that it is difficult to spin the polyethylene stably. It is an important point of the present invention to use a polyethylene having a high molecular weight within a range which permits stable spinning.

In the present invention, such a specific high-density polyethylene is melt-spun using a nozzle for forming hollow fibers to produce unstretched hollow fibers which are highly oriented and highly crystallized. Although a nozzle of double-tubular construction is preferred because it can give a substantially uniform section, a nozzle of horse-shoe shape or other construction may also be used. Where a nozzle of double-tubular construction is used, the air introduced into the hollow fiber to maintain its hollow form may be supplied spontaneously or forcedly.

In order to obtain the porous hollow fiber membranes of the present invention stably, it is desirable that the spinning temperature be 20° to 150° C. higher than the melting point of the polymer. If the spinning is carried out at a temperature lower than this temperature range, the polymer does not melt completely and is liable to melt fracture, resulting in a deterioration of stability in the stretching step. On the contrary, if the spinning is carried out at a temperature higher than this temperature range, it is difficult to obtain a porous hollow fiber membrane having a large pore diameter and a high porosity.

The polymer extruded at a suitable spinning temperature is preferably taken up at a spinning draft of 5 to 5,000. If the spinning draft is greater than 5,000, the resulting unstretched hollow fibers cannot be stretched until a total amount of stretching of 750% or greater is attained. If the spinning draft is less than 5, the resulting unstretched hollow fibers are not highly oriented and cannot be made porous by stretching.

The resulting unstretched hollow fibers are highly oriented in the lengthwise direction of the fibers, and have an inner diameter of 100 to 2,000 μm and a wall thickness of about 15 to 800 μm. These unstretched hollow fibers are heat-treated at a temperature of 100° to 130° C., preferably 115° to 130° C., prior to stretching. The necessary heat-treating (or annealing) time is 30 minutes or more. This annealing yields a more perfect crystal structure, so that an elastic recovery factor after 50% stretching of 50% or greater is achieved.

In the process of the present invention, the stretching is carried out in two stages consisting of cold stretching followed by hot stretching. In cold stretching, it is preferable to fix the stretching point so as to destroy the crystal structure and produces microcrazes uniformly. Moreover, it is desirable to carry out the cold stretching at a high stretching speed which provides a deformation rate of not less than 40% per second. Furthermore, it is also desirable to employ a cold-stretching temperature of 40° C. or below so as to destroy the crystal structure without relaxation and thereby produce microcrazes.

After the hollow fibers are cold-stretched in the above-described manner until an amount of stretching of about 5 to 150% is attained, they are hot-stretched at a temperature within the range of 100° to 130°. If the hot-stretching temperature is higher than this range, the hollow fiber membrane become transparent and the desired porous structure can hardly be obtained. If the hot-stretching temperature is lower than 100° C., the porous structure becomes finer and gives a lower porosity, making it impossible to obtain the desired hollow fiber membrane having a large pore diameter. Moreover, it is a very important point of the present invention to adjust the deformation rate during hot stretching to not greater than 10% per second. If the deformation rate is greater than 10% per second, it is practically impossible to achieve a total amount of stretching of 750% or greater. The total amount of stretching should be within the range of 750 to 2,500%. If the total amount of stretching exceeds 2,500%, the hollow fibers are frequently broken during the stretching operation, resulting in a deterioration of process stability. If the total amount of stretching is less than 750%, a porous structure is created, but a hollow fiber membrane having a large pore diameter and a high porosity in accordance with the present invention cannot be obtained. A total amount of stretching of 750% or greater, preferably 1,000% or greater, and more preferably 1,200% or greater is also necessary for the purpose of achieving a porosity of 75% or greater.

The term "deformation rate" as used herein means a value obtained by dividing the amount of stretching (in %) in a stretching section by the time (in seconds) required for the hollow fiber to pass through the stretching section.

The resulting porous hollow fiber membranes have a substantially stabilized shape as a result of the hot stretching, and do not necessarily require a thermal setting step for fixing their porous structure. If desired, however, they may be thermally set under constant-length conditions under tension or relaxed conditions in the same temperature range as employed for the above-described hot stretching.

The porous polyethylene hollow fiber membranes of large pore diameter obtained in the above-described manner are characterized by an average pore diameter ranging from greater than 2 μm up to 10 μm as measured with a mercury porosimeter, a porosity of 75 to 95%, and an air permeability of not less than $8 \times 10^5$ $1/m^2 \cdot hr \cdot 0.5$ atm. Moreover, these hollow fiber membranes have characteristic rectangular pores formed by microfibrils that are oriented in the lengthwise direction of the fibers and joint portions that are composed of stacked lamellae, the pores being contiguous with each other from the inner wall surface to the outer wall surface of the hollow fiber membranes to form a stacked, multicellular structure. The microfibrils have an average length ranging from greater than 3 μm up to 15 μm.

Figure 2:
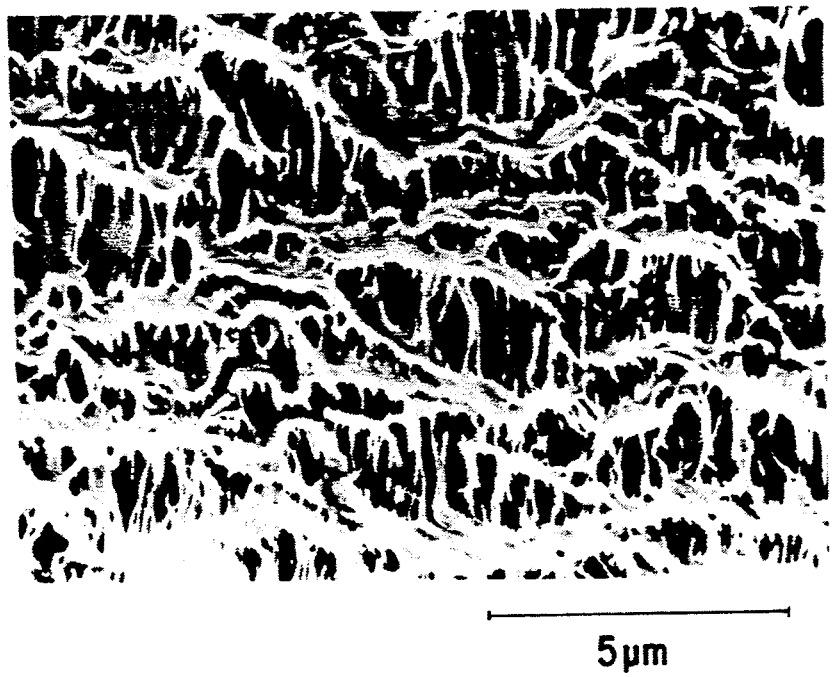
FIG. 2 is a scanning electron photomicrograph illustrating the fibrous structure of the outer wall surface of a porous polyethylene hollow fiber membrane of the prior art.
Figure 3:
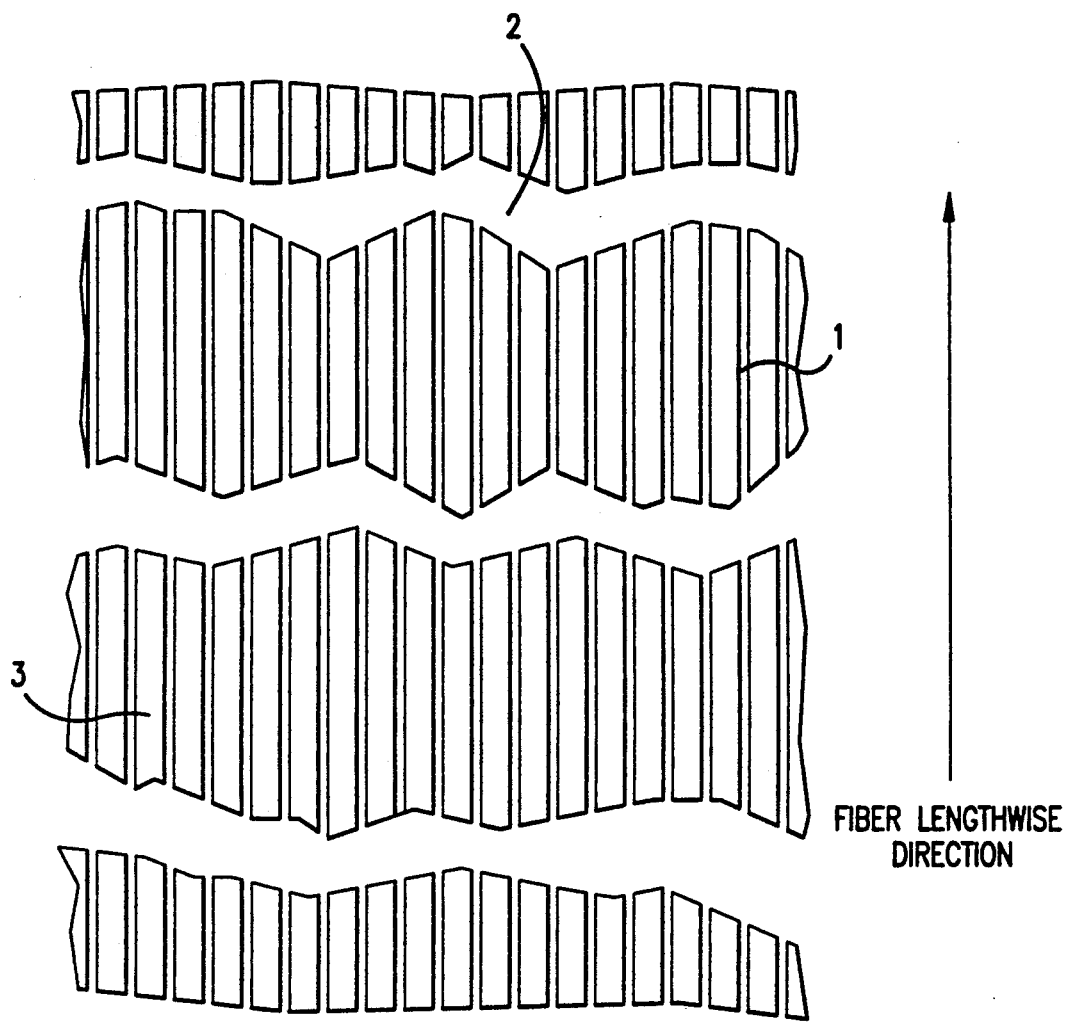
FIG. 3 is a schematic diagram illustrating the detailed fibrous structure of a porous polyethylene hollow fiber membrane of large pore diameter in accordance with the present invention.

FIG. 1 is a scanning electron photomicrograph of the porous polyethylene hollow fiber membrane of large pore size which was formed in Example 1 (given later) according to the teachings of the present invention. Its average pore diameter was 2.7 μm as measured with a mercury porosimeter. FIG. 2 is a scanning electron photomicrograph of the porous polyethylene hollow fiber membrane which was formed in Comparative Example 2 according to the teachings of the prior art. Its average pore diameter is 0.5 μm and much smaller than that of the porous polyethylene hollow fiber membrane of large pore diameter illustrated in FIG. 1. FIG. 3 is a schematic representation of the photomicrograph of FIG. 1 for showing the pore structure in greater detail In this figure, reference numeral 1 denotes a microfibril, 2 denotes a joint portion composed of stacked lamellae, and 3 denotes a rectangular pore.

One type of hydrophilized porous polyethylene hollow fiber membranes in accordance with the present invention comprise the above-described porous polyethylene hollow fiber membranes of large pore diameter having a saponification product of an ethylene-vinyl acetate copolymer held on at least a part of the pore surfaces thereof.

The saponification product of ethylene-vinyl acetate copolymer (i.e., the ethylene-vinyl alcohol copolymer) used in these hydrophilized porous polyethylene hollow fiber membranes can be any of various types of copolymers such as random copolymers, block copolymers and graft copolymers. However, it is preferable that the ethylene content of the copolymer be within the range of 20 to 70 mole %. If the ethylene content is less than 20 mole %, the copolymer has low adhesion to polyethylene and, therefore, the thin layer of the copolymer tends to separate from the pore surfaces of the hollow fiber membrane. If the ethylene content is greater than 70 mole %, the thin layer loses its hydrophilicity. Among others, copolymers having an ethylene content of 25 to 50 mole % are preferred because they have a good balance between adhesion and hydrophilicity. It is believed that ethylene-vinyl alcohol copolymers have good adhesion because they contain, as a component, ethylene having a chemical structure in common with the polyethylene constituting the matrix.

In the hydrophilized porous hollow fiber membranes of the present invention, the term "at least a part of the pore surfaces" of the porous hollow fiber membrane, on which a polymer is held, means a part or the whole of the wall surfaces of the pores. More specifically, the polymer has only to be held on the wall surfaces of the pores to such an extent that a sufficient permeation flow rate is obtained when water is allowed to permeate through the pores of the hollow fiber membrane under a commonly employed transmembrane pressure difference. It is not always necessary to cover the whole wall surfaces of the pores with the polymer. The polymer need not be held on the outer surfaces of the porous hollow fiber membrane.

The term "held" as used herein means that the polymer is firmly bound or attached to the wall surfaces forming the pores to such a degree as not to come off easily during storage or use. Accordingly, the polymer may be chemically bonded to the wall surfaces, attached thereto by an anchoring effect, adherently crosslinked so as to enclose the microfibrils and joint portions forming the rectangular pores, or may be present in a combination of these manners of holding.

Thus, the manner in which the polymer is held on the wall surfaces of the pores of the starting hollow fiber membrane can be any of the above-described manners of holding. However, hydrophilized porous hollow fiber membranes in which the polymer is physically held on the wall surfaces (for example, by anchorage or adherent crosslinking) instead of being chemically bonded thereto are especially preferred because they show little deterioration of mechanical strength and little change of the pore structure as compared with the starting hollow fiber membrane constituting the matrix.

In the hydrophilized porous hollow fiber membranes of the present invention, a hydrophilic copolymer is firmly held so as to enclosed the microfibrils forming the rectangular pores.

The hydrophilized porous polyethylene hollow fiber membranes of the present invention can be produced by treating the pores of the above-described porous polyethylene hollow fiber membranes having a large pore diameter and a high porosity, with a solution of an ethylene-vinyl alcohol copolymer in a water-miscible organic solvent alone or a solvent mixture of such a solvent and water.

The treatment with a solution of an ethylene-vinyl alcohol copolymer comprises the steps of introducing the copolymer solution into the pores of a porous polyethylene hollow fiber membrane as described above according to a soaking or coating technique and then drying the hollow fiber membrane to remove the solvent of the copolymer solution by evaporation.

The organic solvent used to dissolve an ethylene-vinyl alcohol copolymer is a water-miscible organic solvent. Preferred examples of the organic solvent include alcohols such as methanol, ethanol, n-propanol, isopropanol, sec-butanol, tert-butanol and cyclohexanol; polyhydric alcohols such as ethylene glycol, propylene glycol and glycerol; and tetrahydrofuran, dioxane, dimethylformamide, dimethyl sulfoxide, dimethyacetamide, formamide, ethylene chlorohydrin, etc. Among them, ethanol and dimethyl sulfoxide are especially preferred because of their good dissolving power for ethylene-vinyl alcohol copolymers and their low toxicity.

These organic solvents may be used alone or in the form of a mixed solvent system. Among others, a mixture of such an organic solvent and water is a preferred. An ethylene-vinyl alcohol copolymer is composed of ethylene portions that are nonpolar and hydrophobic, and vinyl alcohol portions that are polar and hydrophilic. As a result, it is believed that, when the copolymer is dissolved in a highly polar solvent system and the resulting solution is applied to nonpolar polyethylene, nonpolar ethylene portions tend to be localized on the polyethylene side of the resulting thin layer of the copolymer, and polar vinyl alcohol portions tend to be localized on the surface thereof. This phenomenon is desirable because the adhesion of the thin layer to the pore surfaces is improved and, moreover, the hydrophilicity of the surface of the thin layer is also improved. Thus, it is preferable to use a mixed solvent system prepared by adding water to an organic solvent as described above, because the polarity of the solvent is enhanced to promote the above-described phenomenon. The proportion of water used in the mixed solvent system is preferably maximized so long as the dissolution of the ethylene-vinyl alcohol copolymer is not interferred with. Although the proportion of water may vary according to the ethylene content of the copolymer, the temperature of the solvent, and other factors, the preferred range is, for example, from 5 to 60% by weight. The concentration of the copolymer can be at any level that is suitable for the formation of a thin layer of the copolymer oh the pore surfaces. For example, a concentration of about 0.1 to 5% by weight may suitably be employed. The hydrophilizing treatment may be completed in a single operation, or carried out in several steps by using a copolymer solution having a relatively low concentration.

Although no particular limitation is placed on the temperature of the copolymer solution, higher temperatures are generally preferred because they facilitate the dissolution of the copolymer and reduce the viscosity of the resulting solution. For example, it is preferable to employ a temperature ranging from room temperature to 100° C. The time required for the hydrophilizing treatment preferably ranges from several seconds to several tens of minutes.

In order to remove the solvent from the copolymer solution held in the pores of the porous hollow fiber membrane, there may be employed such techniques as vacuum drying and hot air drying. The drying may be carried out at a temperature at which the hydrophilized porous hollow fibers do not undergo thermal deformation, and it is preferable to employ a temperature of 130° C. or below.

The hydrophilized porou polyethylene hollow fiber membranes of the present invention can also be produced, for example, by holding a solution containing an ethylene-vinyl acetate copolymer on at least a part of the wall surfaces of the pores of a porous polyethylene hollow fiber membrane, forming a thin layer of water-insoluble organic polymer either by drying the hollow fiber membrane to remove the solvent or by dipping the hollow fiber membrane in a solution of a coagulant for the ethylene-vinyl acetate copolymer to subject the copolymer to a quick coagulation treatment, saponifying the ethylene-vinyl acetate copolymer, and then drying the hollow fiber membrane.

Since the ethylene chains of the ethylene-vinyl acetate copolymer has a great affinity for porous polyethylene hollow fiber membranes, the resulting thin layer of the ethylene-vinyl acetate copolymer is firmly held on the pore surface of the porous polyethylene hollow fiber membrane. However, as the ethylene content of the ethylene-vinyl acetate copolymer becomes higher, its adhesion is improved, but its hydrophilicity is reduced. It is preferable, therefore, that the vinyl acetate content of the ethylene-vinyl acetate copolymer be not less than 20 mole %. The concentration of the ethylenevinyl acetate copolymer in the copolymer solution should preferably be within the range of 1 to 5% by weight. If the concentration is less than 1% by weight, sufficient hydrophilicity cannot be obtained after the ethylene-vinyl acetate copolymer is subjected to a saponification treatment. If the concentration is greater than 5% by weight, the pore diameter of the porous polyethylene hollow fiber membrane is reduced, resulting in a deterioration of filtering performance.

The above-described thin layer of waterinsoluble organic polymer should preferably be distributed over the wall surfaces of the pores of the porous hollow fiber membrane as evenly as possible. Moreover, the amount of ethylene-vinyl acetate copolymer held should preferably be minimized so that the pores of the hollow fiber membrane may not suffer from plugging due to the holding treatment. The amount of the saponification of ethylene-vinyl acetate copolymer held on the porous polyethylene hollow fiber membrane of large pore diameter is preferably within the range of 0.5 to 50% by weight and more preferably within the range of 3 to 20% by weight.

The saponification treatment can be carried out, for example, by heating the hollow fiber membrane having the ethylene-vinyl acetate copolymer held thereon in an aqueous solution of an alkali (such as sodium hydroxide) for a predetermined period of time to convert the acetyl groups of its vinyl acetate portions to hydroxyl groups.

Another type of hydrophilized porous polyethylene hollow fiber membranes in accordance with the present invention comprise the above-described porous polyethylene hollow fiber membranes of large pore diameter having a hydrophilic crosslinked polymer, which is formed by polymerizing monomers including diacetone acrylamide and a crosslinkable monomer, held on at least a part of the pore surfaces thereof.

In these hydrophilized porous polyethylene hollow fiber membranes, a hydrophilic crosslinked polymer composed of monomers including diacetone acrylamide and a crosslinkable monomer is held on the wall surfaces of the pores of a porous polyethylene hollow fiber membrane having a large pore diameter and a high porosity. This polymer has been selected with the following reasons. Compared with other polymers, (1) this polymer can adhere firmly to polyethylene; (2) it can be almost uniformly held over substantially the entire wall surfaces of the pores of a porous polyethylene hollow fiber membrane; (3) it has a suitable degree of hydrophilicity; and (4) it is substantially insoluble in water.

The term "hydrophilic crosslinked polymer formed by polymerizing monomers including diacetone acrylamide and a crosslinkable monomer" as used herein means a crosslinked polymer derived from a monomer mixture containing not less than 50% by weight of diacetone acrylamide as a monomer component and also containing a crosslinkable monomer. In addition to them, a non-crosslinkable monomer may be contained therein as a monomer component.

The crosslinkable monomer is a monomer which contains two or more polymerizable unsaturated bonds such as vinyl and allyl bonds that are copolymerizable with diacetone acrylamide, or a monomer which contains one polymerizable unsaturated bond as described above and at least one functional group capable of forming a chemical bond, for example, by a condensation reaction. Moreover, such monomers must have a good solvent in common with diacetone acrylamide. Examples of such monomers include N,N'-methylenebisacrylamide, N-hydroxymethyl(meth)acrylamide, triallyl cyanurate, triallyl isocyanurate, divinylbenzene, 2,2-bis(4-methacryloyloxypolyethoxyphenyl)propane, ethylene di(meth)acrylate, polyethyleneglycol di(meth)acrylate, trimethylolpropane tri(meth)acrylate, pentaerythritol tetra(meth)acrylate, trimethylolethane tri(meth)acrylate, butanediol di(meth)acrylate, hexanediol di(meth)acrylate, diallyl phthalate and 1,3,5-triacryloylhexahyiro-s-triazine.

The non-crosslinkable monomer is a monomer which contains one polymerizable unsaturated bond such as vinyl or allyl bond that is copolymerizable with diacetone acrylamide, and has a good solvent in common with diacetone acrylamide. Examples of such a monomer include dimethylacrylamide, vinylpyrrolidone, acrylic acid, methacrylic acid, hydroxyethyl methacrylate, styrenesulfonic acid, sodium styrenesulfonate, sodium sulfoethylmethacrylate, vinylpyridine and vinyl methyl ether.

These crosslinkable and non-crosslinkable monomers which are used in combination with diacetone acrylamide will hereinafter be referred to collectively as "copolymerizable monomers".

As regards the proportions of diacetone acrylamide and the crosslinkable monomer which in combination form the hydrophilic crosslinked polymer, the crosslinkable monomer is preferably used in an amount of 0.3 to 100 parts by weight, more preferably 0.5 to 80 parts by weight, per 100 parts by weight of diacetone acrylamide. As regards the proportion of the copolymerizable monomers, they are preferably used in an amount of 0.3 to 110 parts by weight, more preferably 0.5 to 100 parts by weight, per 100 parts by weight of diacetone acrylamide.

In the present invention, the polymer held on at least a part of the wall surfaces of the pores of a porous polyethylene hollow fiber membrane having a large pore diameter and a high porosity is a crosslinked polymer. This polymer has the advantageous that it undergoes only a slight degree of swelling in water and involves no risk of plugging the pores. Moreover, this polymer has the additional advantage that it has good stability and its components scarcely dissolve out in water. Accordingly, the hydrophilized porous hollow fiber membranes of the present invention are useful in the fields of water treatment and blood treatment in which even a slight amount of dissolved components may become a problem. In contrast, a diacetone acrylamide polymer having no crosslinked structure swells in water and plugs the pores. It also dissolves in water to produce dissolved components, albeit in small amounts. Thus, porous hollow fiber membranes having such a polymer held thereon have the risk of presenting various problems during use.

The higher the degree of hydrophilicity of the polymer, the better the water permeation performance of the resulting hydrophilized porous hollow fiber membrane. Accordingly, a water-soluble crosslinkable monomer having a sufficient degree of hydrophilicity is preferably used as the crosslinkable monomer for forming the hydrophilic crosslinked polymer, because the resulting hydrophilized porous hollow fiber membrane allows water to permeate evenly through the entire membrane area in a short time after starting their use.

Such a water-soluble crosslinkable monomer is a crosslinkable monomer having a water solubility of 1.0 g/dl or greater in water at 30° C. Examples thereof include N-hydroxymethylacrylamide, N-hydroxymethylmethacrylamide and N,N'-methylenebisacrylamide.

The amount of hydrophilic crosslinked polymer held on at least a part of the wall surfaces of the pores of a porous polyethylene hollow fiber membrane in accordance with the present invention is preferably within the range of about 0.5 to 100% by weight based on the weight of the porous polyethylene hollow fiber membrane, though it depends on the porosity and pore diameter of the porous polyethylene hollow fiber membrane. If the amount of polymer held is less than the above-described range, it is impossible to impart sufficient hydrophilicity to the porous hollow fibers. On the other hand, even if the amount of polymer held is greater than the above-described range, the hydrophilicity of the porous hollow fiber membrane show no further improvement. On the contrary, the volume of the pores may be decreased to cause a reduction in water permeation performance. The amount of polymer held is more preferably within the range of about 0.5 to 50% by weight and most preferably within the range of about 1 to 30% by weight.

A variety of methods may be employed to hold the hydrophilic crosslinked polymer on at least a part of the wall surfaces of the pores of the porous polyethylene hollow fiber membrane. By way of example, a solution is prepared by dissolving diacetone acrylamide and the above-described copolymerizable monomers (hereinafter referred to collectively as "monomers") and a polymerization initiator in a suitable solvent such as an organic solvent or water. Then, a starting hollow fiber membrane is impregnated with the solution of the monomers by soaking the starting hollow fibers in the solution, or by fabricating a membrane module with the starting hollow fiber membrane and then causing the solution to penetrate under pressure into the starting hollow fiber membrane. Thereafter, the solvent is removed by evaporation. By using a solution prepared by diluting the monomers with a solvent, the monomers can be almost uniformly deposited over the entire surfaces of the porous hollow fiber membrane without plugging the pores of the porous hollow fiber membrane. The amount of monomers deposited can be controlled by varying the concentrations of the monomers in the solution and the time spent for impregnation with the solution.

After the monomers are held on at least a part of the wall surfaces of the pores of the starting hollow fibers in the above-described manner, the solvent is removed and the monomers are then polymerized. Thus, there is obtained a hydrophilic crosslinked polymer held on at least a part of the wall surfaces of the pores of the porous polyethylene hollow fiber membrane.

The solvent used for the preparation of the above-described solution can be water or an organic solvent which has a boiling point lower than those of the monomers and can dissolve the monomers. Where a polymerization initiator is added, it is preferable to use a solvent which can also dissolve the polymerization initiator. Such organic solvents include, for example, alcohols such as methanol, ethanol, propanol and isopropanol; ketones such as acetone, methyl ethyl ketone and methyl isobutyl ketone; ethers such as tetrahydrofuran and dioxane; and ethyl acetate. Although no particular limitation is placed on the boiling point of the organic solvent, it is preferably 100° C. or below and more preferably 80° C. or below because such a boiling point facilitates the removal of the solvent prior to the polymerization step.

Since the surfaces of a porous polyethylene hollow fiber membrane are hydrophobic, the penetration of an aqueous solution containing the monomers into the pores tends to cause the monomers to be adsorbed on the pore surfaces with their hydrophilic groups oriented outward, especially where water is used as the solvent. Thus, if the monomers are fixed in this state by polymerization, it is possible to impart hydrophilicity to the porous hollow fiber membrane very efficiently. Where water is used as the solvent, the porous hollow fibers may be directly brought into contact with the solution. Alternatively, they may also be brought into contact with the solution after the wall surfaces of the pores thereof have been subjected to a wetting treatment with an alcohol or ketone in advance.

In contrast, the use of an organic solvent as the solvent has the advantage that the solution can penetrate into the pores of the starting hollow fiber membrane in a short period of time and the solvent can be easily removed from the pores.

Even if the monomers are polymerized on the pore surfaces in a randomly oriented state without making use of the above-described oriented adsorption, the resulting hydrophilic crosslinked polymer has a higher degree of hydrophilicity than polyethylene. Accordingly, the pore surfaces having the polymer held thereon is relatively hydrophilic, as compared with the pore surfaces having no polymer held thereon. Thus, there can be obtained a porous polyethylene hollow fiber membrane having hydrophilicity imparted thereto.

The need for a polymerization initiator depends on the polymerization technique employed. A polymerization initiator is used in thermal polymerization and photopolymerization, but no polymerization initiator is needed for radiation polymerization.

In the case of thermal polymerization, there may be used various peroxides, azo compounds and redox initiators which are known as radical polymerization initiators. Examples thereof include azo compounds such as 2,2'-azobisisobutyronitrile, 2,2'-azobiscyclopropylpropionitrile, 2,2'-azobis-2,4-dimethylvaleronitrile and 2,2,-azobis-2,3,3-trimethylbutyronitrile; peroxides such as acetyl peroxide, propionyl peroxide, butyryl peroxide, isobutyryl peroxide, succinyl peroxide, benzoyl peroxide, benzoylisobutyryl peroxide, β-allyloxypropionyl peroxide, hexanoyl peroxide, 3-bromobenzoyl peroxide and bis(4-tert-butylcyclohexyl) peroxydicarbonate; and persulfates such as potassium persulfate and ammonium persulfate.

Especially where water is used as the solvent, water-soluble polymerization initiators such as azobisisobutyramidine and 4,4'-azobis-4-cyanopentanoic acid are preferred. However, the above-described waterinsoluble polymerization initiator may also be used because they can be dispersed in water owing to the surface activity of the monomers themselves.

In the case of photopolymerization, there can be used polymerization initiators such as benzophenone, benzoin methyl ether, benzyl dimethyl ketal, fluorenone, 4-bromobenzophenone, 4-chlorobenzophenone methyl O-benzoylbenzoate, benzoyl peroxide, anthraquinone, biacetyl and uranyl nitrate. These polymerization initiatos may be suitably used in combination.

The proportion of the monomers and the solvent in the solution may be suitably determined with consideration for the type of the solvent, the desired amount of polymer held, and other factors. The solvent is preferably used in an amount of 50 to 10,000 parts by weight, more preferably 200 to 5,000 parts by weight, per 100 parts by weight of the monomers.

The polymerization initiator is preferably used in an amount of 0.001 to 100 parts by weight, more preferably 0.01 to 30 parts by weight, and most preferably 0.1 to 20 parts by weight, per 100 parts by weight of the monomers.

If the amount of solvent used is greater than the above-described range relative to the monomers, the amount of monomers held on the wall surfaces of the pores of the porous hollow fiber membrane is so small that a sufficient amount of polymer cannot be held thereon. If the amount of solvent used is less than the abovedescribed range, it is difficult to control the amount of polymer held. Moreover, the amount of polymer held on the wall surfaces of the pores and within the pores is so large that the pores may be plugged.

When the starting hollow fiber membrane is subjected to a soaking or penetration treatment by using the above-described solution, the soaking or penetration time may range from about 0.5 second to about 30 minutes. This treatment can be completed in a shorter period of time as the wetting properties of the solution for the starting hollow fiber membrane becomes better.

After the monomers and, optionally, the polymerization initiator are held on at least a part of the wall surfaces of the pores of the porous polyethylene hollow fiber membrane in the above-described manner, the excess of solution was removed and, if desired, the solvent present within the pores is removed by evaporation. Then, the monomer held are transferred to a polymerization step.

If the temperature used for evaporation of the solvent is excessively high, the polymerization proceeds partially while the solvent still remains. Thus, the polymerization takes place in the interior of the pores of the porous hollow fiber membrane and not on the wall surfaces of the pores, so that the pores may be plugged. With consideration for this problem, it is preferable to remove the solvent at a temperature of 10° to 40° C.

In producing the hydrophilized porous hollow fiber membranes of the present invention, there may employed various polymerization techniques such as thermal polymerization, photopolymerization, radiation polymerization and plasma polymerization.

In thermal polymerization, the polymerization temperature should be equal to or higher than the decomposition temperature of the above-described polymerization initiator. Moreover, it is desirable that the polymerization temperature is neither so high as to change the membrane structure of the porous polyethylene hollow fibers nor so high as to damage the membrane matrix. Usually, a polymerization temperature of 30° to 100° C. can be used. Although the heating time depends on the type of the polymerization initiator and the heating temperature, it generally ranges from 1 minute to 5 hours and preferably from 15 minute to 3 hours in a batch process. In a continuous process, the polymerization can be carried out in a shorter period of time because heat transfer efficiency is higher. Accordingly, the heating time generally ranges from 10 seconds to 60 minutes and preferably from 20 seconds to 10 minutes.

In photopolymerization, ultraviolet or visible light can be used as the light for irradiation. As the source of ultraviolet light, there may be used a lowpressure mercury vapor lamp, high-pressure mercury vapor lamp, xenon lamp, arc lamp or the like.

For example, where a mercury vapor lamp is used as the light source, the following light irradiation conditions may be employed. While the lamp is operated at an input of 10 to 300 W/cm, the porous hollow fiber membrane is placed at a distance of 10 to 50 cm from the lamp and irradiated therewith for a period of 0.5 to 300 seconds. Thus, they are exposed to an energy of 0.001 to 10 joules/cm$^2$ and preferably 0.05 to 1 joule/cm$^2$.

An unduly low irradiation intensity makes it difficult to achieve a sufficient degree of hydrophilization. On the other hand, an unduly high irradiation intensity causes considerable damage to the porous polyethylene hollow fiber membrane. Accordingly, it is desirable to choose suitable light irradiation conditions carefully with consideration for the membrane thickness and other factors.

In radiation polymerization, the polymerization can be carried out, for example, by using an electron-ray irradiation apparatus to irradiate the porous hollow fibers with electron rays to a dose of 10 to 50 Mrads at a temperature of 120° C. or below and preferably 100° C. or below.

If oxygen is present in the atmosphere during polymerization, the polymerization reaction is significantly inhibited. Accordingly, it is desirable to carry out the polymerization in a substantially oxygen-free state, for example, in an atmosphere of an inert gas such as nitrogen or in vacuo.

In forming the hydrophilic crosslinked polymer, the crosslinking reaction may be effected concurrently with the polymerization reaction. Alternatively, it may be effected subsequent to the formation of a copolymer. The crosslinking reaction, when it depends on condensation, may be effected by utilizing the heat of polymerization reaction or by additionally heating the polymerization system.

Where a condensation-dependent crosslinking reaction is used, the crosslinking reaction may be effected by dissolving a previously prepared uncrosslinked copolymer of diacetone acrylamide and a crosslinkable monomer in a solvent, holding a mixture of the polymer and the monomer on the wall surfaces of the pores of the porous polyethylene hollow fiber membrane, and then subjecting the copolymer to a crosslinking reaction in that state. In this case, the uncrosslinked copolymer preferably has a molecular weight of 10,000 to 500,000. If its molecular weight is too high, it is difficult to make the copolymer penetrate into the pores of the porous polyethylene hollow fiber membrane. Therefore, use of such a high molecular weight is undesirable. More preferably, the molecular weight is within the range of 50,000 to 300,000.

In producing the hydrophilized porous hollow fiber membranes of the present invention, various polymerization techniques can be employed as described above. However, it is most preferable to effect the polymerization by means of thermal energy. The reason of this is that since the use of thermal energy permits even the pore portions of the porous hollow fibers to be heated evenly, the monomers can be uniformly polymerized on the entire pore surfaces on which they are held. Thermal polymerization also has the additional advantage that, if the polymerization temperature is properly determined, the polymerization can be effected without modification of the membrane structure or deterioration of the membrane matrix. In contrast, the use of light energy has the disadvantage that light cannot fully reach the inner part of the pores of the porous hollow fiber membrane due to scattering of the light and that the deterioration of the membrane matrix is accelerated at higher irradiation intensities of the light. Moreover, the use of radiation energy also has the disadvantage that the membrane matrix is liable to accelerated deterioration. Accordingly, where these polymerization techniques are employed, it is necessary to carefully choose polymerization conditions which do not deteriorate the membrane matrix.

Since the monomers or uncrosslinked copolymer held on the wall surfaces of the pores of the starting hollow fiber membrane are polymerized/crosslinked or crosslinked in situ according to any of the above-described polymerization techniques, at least a part of the wall surfaces of the pores of the porous hollow fiber membrane are covered with the resulting polymer.

After the hydrophilic crosslinked polymer is formed, it is desirable to remove unnecessary materials (such as unreacted monomers and free polymer) remaining around the wall surfaces of the pores of the porous hollow fiber membrane by a soaking or penetration treatment with a suitable solvent. As the solvent, water, an organic solvent or a mixture thereof may be used alone or in combination.

The hydrophilized porous hollow fiber membranes of the present invention can be produced in the abovedescribed manner. A particularly preferred process comprises holding monomers (including diacetone acrylamide and a water-soluble crosslinkable monomer) and a polymerization initiator on at least a part of the wall surfaces of the pores of a porous polyethylene hollow fiber membrane, and then polymerizing the monomers by the application of heat.

If a water-soluble crosslinkable monomer is used as a copolymerizable monomer, the swelling of the resulting polymer in water is suppressed, so that the amount of dissolving-out components can be decreased further and, at the same time, the resulting hydrophilized porous hollow fiber membrane exhibits excellent water permeation performance.

Moreover, hydrophilized porous hollow fiber membranes produced by thermal polymerization have the advantage that the polymer is held uniformly in the direction of the thickness of the membrane and the membrane matrix is substantially free of damage.

The individual steps have been separately described above. However, it is to be understood that, in producing the hydrophilized porous hollow fiber membranes of the present invention, various steps such as holding of the monomers on the wall surfaces of the pores of a porous polyethylene hollow fiber membrane, removal of the solvent, polymerization, and washing after polymerization can be carried out in a substantially continuous manner.

The present invention will be more specifically explained with reference to the following examples. In these examples, measurements were made according to the methods described below.

1. Evaluation of hollow fiber membranes
(1) Air permeability:
Fifty porous hollow fibers were bundled in a U-shape and their open end portions were fastened with a urethane resin to fabricate a module. The length of the portions embedded in the resin was 2.5 cm and the effective length of the hollow fibers was 5 cm. An air pressure of 0.5 atmosphere was applied to the inside of the hollow fibers of the module at a temperature of 25° C., and the amount of air that escaped through the walls of the hollow fibers was determined. The membrane area was calculated on the basis of the inner diameter of the hollow fibers.

(2) Elastic recovery factor:
Using a Model UTM-II Tensilon manufactured by Toyo Bowldwin Co., measurements were made at a fiber length of 2 cm and a testing rate of 1 cm per minute. Then, the elastic recovery factor was determined according to the following equation.

Elastic recovery factor =

$$\frac{\text{Fiber length when stretched by 50\%} - \text{Fiber length when the load was returned to zero after stretching by 50\%}}{\text{Fiber length when stretched by 50\%} - \text{Fiber length before stretching}} \times 100(\%)$$

(3) Average length of microfibrils:
The average length of microfibrils was determined from an electron photomicrograph.

2. Evaluation of hydrophilized porous hollow fibers
"Water permeation pressure", "water permeability after hydrophilized by using alcohol" and "water permeability after holding a polymer" were measured according to the following methods, using test membrane modules each having an effective membrane area of 163 cm$^2$. The solubilities in water at 30° C. of N-hydroxymethylacrylamide, N,N'-methylene bisacrylamide and triallyl isocyanurate, which were used in the following examples, were 197 g/dl, 3 g/dl and 0.1 g/dl, respectively.

(1) Water permeation pressure:
Water at 25° C. was fed from one side (the inside of hollow fibers in the case of a hollow fiber membrane) of a test membrane module while the water pressure was raised at a rate of 0.1 kg/cm$^2$ per minute. Thus, water pressures were separately measured when the cumulative amount of penetrated water reached 30 ml and 50 ml. These data were plotted with the water pressures as abscissa and the amount of penetrated water as ordinate, and a straight line connecting these two points was drawn. The pressure at which this straight line intersected the abscissa axis was determined and regarded as the water permeation pressure.

(2) Water permeability after hydrophilized by using alcohol:
From one side (the inside of hollow fibers in the case of a hollow fiber membrane) of a test membrane module which had not been subjected to any hydrophilizing treatment, ethanol was fed under pressure at a flow rate of 25 ml/min for 15 minutes to wet the porous membrane fully with ethanol to the interior of its pores. Thereafter, water was made to flow at a flow rate of 100 ml/min for 15 minutes, so that the ethanol present in the pores was replaced by water. Then, water at 25° C. was made to flow on one side (the inside of hollow fibers in the case of a hollow fiber membrane) of the test membrane module and the amount of permeated water was measured at a transmembrane pressure difference of 50 mmHg. The water permeability (in l/ m$^2$·hr·mmHg) was determined from the measured amount of permeated water.

(3) Amount of polymer held:
The nitrogen content was determined by elemental analysis. On the assumption that the nitrogen was derived solely from the polymer and the composition of the polymer was the same as the monomer composition, the amount of hydrophilic crosslinked polymer held per unit weight of the porous polyethylene hollow fiber membrane was determined in terms of weight percentage.

(4) Evaluation of the state of coverage of pore surfaces:

A porous hollow fiber was soaked for 1 minute in a standard solution (blue) for wetting tests as described in JIS K6768(1971), which solution has a surface tension of 54 dyne/cm. After the hollow fiber was air-dried, a cross-section thereof was observed under an optical microscope to examine the state of distribution of the colored polymer.

(5) Cumulative dissolution:

A porous hollow fiber were soaked in warm water at 65° C., whose amount was equal to 10 times the weight of the hollow fiber. Then, the total organic carbon content of the warm water was measured at regular intervals. On the assumption that this total organic carbon content was derived solely from the hydrophilic crosslinked polymer having the composition assumed in the above test (3), the cumulative dissolution (in wt. %) was determined relative to the amount of polymer held before the dissolving-out treatment.

(6) Water permeability after holding a polymer:

From one side of (the inside of hollow fibers in the case of a hollow fiber membrane) of a test membrane module fabricated with a porous hollow fiber membrane having a polymer held thereon, water was fed under a pressure of 2 kg/cm$^2$ for 3 hours. Then, water at 25° C. was made to flow on the one side of the test membrane module, and the amount of permeated water was measured at a transmembrane pressure difference of 50 mmHg. The water permeability (in l/m$^2$·hr·mmHg) was determined from the measured amount of permeated water.

EXAMPLE 1

Using a hollow fiber-forming spinneret having an extruding port diameter of 16 mm, an annular slit width of 2.5 mm, and a cross-sectional area of extruding port of 1.06 cm$^2$, a high-density polyethylene (NOVATEC BU 007U; a product of Mitsubishi Kasei Corporation) having a density of 0.968 g/cm$^3$ and a melt index of 0.7 was spun at a spinning temperature of 180° C. and an extrusion line speed of 32.1 cm/min. The spun hollow fiber was cooled with a counter current of air having a temperature of 25° C. and a velocity of 4.0 m/sec, and taken up at a take-up speed of 75 m/min and a spinning draft of 234. The resulting unstretched hollow fiber had an inner diameter of 570 μm and a wall thickness of 173 μm.

This unstretched hollow fiber was heat-treated with holding it not to change its length at 125° C. for 24 hours. The elastic recovery factor of this unstretched hollow fiber was 72%. Subsequently, the heat-treated hollow fiber was stretched by 110% at room temperature with a deformation rate of 160% per second, and then stretched by rollers in a box heated at 118° C. with a deformation rate of 3.5% per second until a total amount of stretching of 1,350% (i.e., a total stretching ratio of 14.5) was attained, thereby producing a porous hollow fiber membrane continuously. The resulting porous polyethylene hollow fiber membrane had been stretched 14.5-fold relative to the unstretched hollow fiber, and it had an inner diameter of 500 μm, a wall thickness of 150 μm, and a porosity of 86%. Its average pore diameter was 2.7 μm as measured with a mercury porosimeter, and its air permeability was 140×10$^4$ l/m$^2$·hr·0.5 atm.

Observation with a scanning electron microscope revealed that there were a countless number of characteristic rectangular pores and the average length of microfibrils was 7.5 μm. FIG. 1 is a scanning electron photomicrograph illustrating the typical porous structure of the outer wall surface of this porous polyethylene hollow fiber membrane.

EXAMPLE 2

Using a hollow fiber-forming spinneret of double-tubular construction having an extruding port diameter of 25 mm, an annular slit width of 1.5 mm, and a cross-sectional area of extruding port of 0.754 cm$^2$, a high-density polyethylene (HIZEX 2200J; a product of Mitsui Petrochemical Industries Ltd.) having a density of 0.968 g/cm$^3$ and a melt index of 5.5 was spun at a spinning temperature of 165° C. and an extrusion line speed of 10.5 cm/min. The spun hollow fiber was cooled with a counter current of air having a temperature of 25° C. and a velocity of 3.0 m/sec, and taken up at a take-up speed of 300 m/min and a spinning draft of 2,860. The resulting unstretched hollow fiber had an inner diameter of 250 μm and a wall thickness of 35 μm.

This unstretched hollow fiber was heat-treated with holding it not to change its length at 120° C. for 24 hours. The elastic recovery factor of this unstretched hollow fiber was 73%. Subsequently, the heat-treated hollow fiber was stretched by 80% at room temperature with a deformation rate of 160% per second, then stretched by rollers in a box heated at 125° C. with a deformation rate of 7.0% per second until a total amount of stretching of 800% was attained, and further thermally set in a box heated at 125° C. for 40 seconds, thereby producing a porous hollow fiber membrane continuously. The resulting porous polyethylene hollow fiber membrane had been stretched 9.0-fold relative to the unstretched hollow fiber, and it had an inner diameter of 240 μm, a wall thickness of 30 μm, and a porosity of 82%. Its average pore diameter was 2.1 μm as measured with a mercury porosimeter, and its air permeability was 91×10$^4$ l/m$^2$·hr·0.5 atm. Observation with a scanning electron microscope revealed that there were a countless number of characteristic rectangular pores and the average length of microfilbrils was 3.8 μm.

EXAMPLE 3 using a hollow fiber-forming spinneret having an extruding port diameter of 16 mm, an annular slit width of 2.5 mm, and a cross-sectional area of extruding port of 1.06 cm$^2$, a high-density polyethylene (NOVATEC BU 004U; a product of Mitubishi Kasei Corporation) having a density of 0.969 g/cm$^3$ and a melt index of 0.35 was spun at a spinning temperature of 230° C. and an extrusion line speed of 28.0 cm/min. The spun hollow fiber was cooled with a counter current of air having a temperature of 25° C. and a velocity of 4.0 m/sec, and taken up at a take-up speed of 50 m/min and a spinning draft of 179. The resulting unstretched hollow fiber had an inner diameter of 583 μm and a wall thickness of 168 μm.

This unstretched hollow fiber was heat-treated with holding it not to change its length at 125° C. for 24 hours. The elastic recovery factor of this unstretched hollow fiber was 70%. Subsequently, the heat-treated hollow fiber was stretched by 120% at room temperature with a deformation rate of 160% per second, and then stretched by rollers in a box heated at 120° C. with a deformation rate of 2.8% per second until a total amount of stretching of 1,900% was attained, thereby producing a porous hollow fiber membrane continuously. The resulting porous polyethylene hollow fiber membrane had been stretched 20-fold relative to the unstretched hollow fiber, and it had an inner diameter of 475 μm, a wall thickness of 130 μm, and a porosity of 89%. Its average pore diameter was 5.1 μm as measured with a mercury porosimeter, and its air permeability was $290 \times 10^4$ l/m$^2$·hr·0.5 atm.

Observation with a scanning electron microscope revealed that there were a countless number of characteristic rectangular pores and the average length of microfibrils was 11.5 μm.

COMPARATIVE EXAMPLE 1

A hollow fiber was spun under the same conditions as employed in Example 2, except that a high-density polyethylene (NOVATEC JV 070S; a product of Mitsubishi Kasei Corporation) having a density of 0.968 g/cm$^3$ and a melt index of 6.7 was used. The resulting unstretched hollow fiber had an inner diameter of 240 μm and a wall thickness of 32 μm.

This unstretched hollow fiber was heat-treated and stretched under the same conditions as employed in Example 2. However, the hollow fiber was frequently broken during hot stretching and could not be uniformly stretched until a total amount of stretching of 750% was attained.

COMPARATIVE EXAMPLE 2

The same unstretched hollow fiber as obtained in Comparative Example 1 was heat-treated under the same conditions as employed in Example 2, and then stretched until a total amount of stretching of 400% was attained. The resulting porous polyethylene hollow fiber membrane had an inner diameter of 205 μm and a wall thickness of 25 μm. Its porosity was 69%, its average pore diameter was 0.5 μm as measured with a mercury porosimeter, and its air permeability was $24 \times 10^4$ l/m$^2$·hr·0.5 atm.

FIG. 2 is a scanning electron photomicrograph illustrating the typical porous structure of the outer wall surface of this porous polyethylene hollow fiber membrane.

EXAMPLE 4

Using a hollow fiber-forming spinneret having an extruding port diameter of 16 mm, an annular slit width of 2.5 mm, and a cross-sectional area of extruding port of 1.45 cm$^2$, a high-density polyethylene (NOVATEC BU 007U; a product of Mitsubishi Kasei Corporation) having a density of 0.970 g/cm$^3$ and a melt index of 0.7 was spun at a spinning temperature of 180° C. and an extrusion line speed of 12.2 cm/min. The spun hollow fiber was cooled with a counter current of air having a temperature of 25° C. and a velocity of 3.0 m/sec, and taken up at a take-up speed of 40 m/min and a spinning draft of 328. The resulting unstretched hollow fiber had an inner diameter of 580 μm and a wall thickness of 178 μm.

This unstretched hollow fiber was heat-treated with holding it not to change its length at 125° C. for 24 hours. The elastic recovery factor of this unstretched hollow fiber was 73%. Subsequently, the heat-treated hollow fiber was stretched by 120% at room temperature with a deformation rate of 200% per second, and then stretched by rollers in an oven heated at 118° C. with a deformation rate of 2.5% per second until a total amount of stretching of 1,400% was attained, thereby producing a porous hollow fiber membrane continuously.

The resulting porous polyethylene hollow fiber membrane had been stretched 15.0-fold relative to the unstretched hollow fiber, and it had an inner diameter of 505 μm, a wall thickness of 155 μm, and a porosity of 87%. Its average pore diameter was 2.7 μm as measured with a mercury porosimeter, and its air permeability was $140 \times 10^4$ l/m$^2$·hr·0.5 atm. Observation with a scanning electron microscope revealed that there were a countless number of characteristic rectangular pores and the average length of microfibrils was 7.5 μm.

On the other hand, an ethylene-vinyl alcohol copolymer (Soanol E; a product of Nippon Synthetic Chemical Industries Co., Ltd.) having an ethylene content of 33 mole % was added to a 75 vol. % aqueous solution of ethanol and dissolved therein by the application of heat to prepare a 1 wt. % solution thereof. While the temperature of this solution was maintained at 50° C., the above-described porous polyethylene hollow fiber membrane was placed in the solution and allowed to stand for 5 minutes. After the excess of copolymer solution was removed, the hollow fiber membrane was dried in a hot-air oven at 50° C. for 2 hours.

The resulting hydrophilized porous hollow fiber membrane having a large pore diameter and a high porosity was easily wettable with water. When this porous hollow fiber membrane was soaked in water, it was easily wetted with water and exhibited water permeability without requiring any particular treatment. Fifty segments of this porous hollow fiber membrane were bundled in a U-shape and placed in a housing, and their ends were fixed to the housing with a resin to fabricate a module. When measurements were made using this module, the hollow fiber membrane was found to have a water permeability of 55 l/m$^2$·hr·mmHg and exhibit excellent water permeation performance. Furthermore, the hollow fiber membrane was alternately dried and wetted ten times, but neither reduction in water permeability nor change in mechanical properties was observed.

EXAMPLE 5

A solution was prepared by dissolving 3 parts by weight of an ethylene-vinyl acetate copolymer (in a ratio of 55:45) in 97 parts by weight of toluene. While this solution was kept at 25° C., a porous polyethylene hollow fiber membrane obtained in the same manner as described in Example 4 and having a large pore diameter and a high porosity was soaked therein for 30 seconds. Thereafter, the hollow fiber membrane was dried in a vacuum dryer at 50° C. for 3 hours to remove the solvent.

Then, the hollow fiber membrane was placed in an aqueous alkaline solution prepared by dissolving 10 g of sodium hydroxide in 1 liter of water, and subjected to a saponification treatment at 70° C. for 1 hour. Thereafter, the hollow fiber membrane was washed with water and dried to obtain a hydrophilized porous polyethylene hollow fiber membrane.

Fifty segments of this hollow fibers were bundled in a U-shape, and their ends were fixed to a housing with a resin to fabricate a module. When measurements were made using this module, the hollow fiber membrane was found to have a water permeability of 50 l/m$^2$·hr·mmHg and exhibit excellent water permeation performance. Furthermore, the hollow fiber membrane was alternately dried and wetted ten times, but neither reduction in water permeability nor change is mechanical properties was observed.

EXAMPLE 6

Using a hollow fiber-forming spinneret having an extruding port diameter of 16 mm, an annular slit width of 2.5 mm, and a cross-sectional area of extruding port of 1.45 cm$^2$, a high-density polyethylene (NOVATEC BU 007U; a product of Mitsubishi Kasei Corporation) having a density of 0.970 g/cm$^3$ and a melt index of 0.7 was spun at a spinning temperature of 180° C. and an extrusion line speed of 12.2 cm/min. The spun hollow fiber was cooled with a counter current of air having a temperature of 25° C. and a velocity of 3.0 m/sec, and taken up at a take-up speed of 40 m/min and a spinning draft of 328. The resulting unstretched hollow fiber had an inner diameter of 580 µm and a wall thickness of 178 µm.

This unstretched hollow fiber was heat-treated with holding it not to change its length at 125° C. for 24 hours. The elastic recovery factor of this unstretched hollow fiber was 73%. Subsequently, the heat-treated hollow fiber was stretched by 100% at room temperature with a deformation rate of 200% per second, and then stretched by rollers in an oven heated at 118° C. with a deformation rate of 2.5% per second until a total amount of stretching of 1,400% (i.e., a total stretching ratio of 15.0) was attained, thereby producing a porous hollow fiber membrane continuously. The resulting porous polyethylene hollow fiber membrane had been stretched 15.0-fold relative to the unstretched hollow fiber, and it had an inner diameter of 505 µm and a wall thickness of 155 µm. Its average pore diameter was 3.2 µm as measured with a mercury porosimeter, its air permeability was 190×10$^4$ l/m$^2$·hr·0.5 atm, and its porosity was 87%. Observation with a scanning electron microscope revealed that there were a countless number of characteristic rectangular pores and the average length of microfibrils was 7.5 µm. Its water penetration pressure was 3.2 kg/cm$^2$ and its water permeability after hydrophilized by using alcohol was 55 l/m$^2$·hr·mmHg.

The resulting porous polyethylene hollow fiber membrane having a large pore diameter and a high porosity was soaked for 10 seconds in a treating solution composed of 100 parts of diacetone acrylamide, 5 parts of N-hydroxymethylacrylamide, 1 part of benzoyl peroxide, and 1,000 parts of acetone. The hollow fiber membrane was taken out of the treating solution and dried in flowing nitrogen for 5 minutes. Subsequently, the hollow fiber membrane was heat-treated at 65° C. for 60 minutes in an atmosphere of nitrogen and then soaked in a 50:50 solvent mixture of water and ethanol for 10 minutes. Thereafter, the hollow fiber membrane was ultrasonically cleaned in warm water for 2 minutes to wash off unnecessary materials, and then dried in hot air to remove the solvent. Thus, there was obtained a porous polyethylene hollow fiber membrane having a polymer held thereon. The water penetration pressure, water permeability, amount of polymer held, and cumulative dissolution of this porous hollow fiber membrane were measured, and the results thus obtained are shown in Table 1.

The water permeation performance of the resulting hydrophilized porous polyethylene hollow fiber membrane was excellent. Observation with a scanning electron microscope revealed that the polymer was almost uniformly held over substantially the entire wall surfaces of the pores of the porous polyethylene hollow fiber membrane. Moreover, the measurements of cumulative dissolution revealed that essentially no component dissolved out after 24 hours.

EXAMPLES 7-9

A series of polymers were separately held on porous polyethylene hollow fiber membranes under the same conditions as employed in Example 6, except that N-hydroxymethylacrylamide was used as the crosslinkable monomer in the respective amounts shown in Table 1.

The performance of the resulting hydrophilized porous polyethylene hollow fiber membranes was evaluated, and the results thus obtained are shown in Table 1.

EXAMPLE 10

Using a porous polyethylene hollow fiber membrane obtained in the same manner as described in Example 6, a polymer was held thereon under the same conditions as employed in Example 6, except that a treating solution composed of 100 parts of diacetone acrylamide, 5 parts of N,N'-methylenebisacrylamide, 5 parts of 2,2'-azobisisobutyronitrile, and 800 parts of acetone was used, and the hollow fiber membrane was heat-treated at 65° C. for 60 minutes. The performance of the resulting hydrophilized porous polyethylene hollow fiber membrane was evaluated, and the results thus obtained are shown in Table 1.

When the state of coverage with the hydrophilic crosslinked polymer was observed, it was found that polymer was almost uniformly held over substantially the entire wall surface of the pores. Moreover, the measurements of cumulative dissolution revealed that essentially no component dissolved out after 24 hours.

EXAMPLE 11

Using a hollow fiber-forming spinneret having an extruding port diameter of 25 mm, an annular slit width of 1.5 mm, and a cross-sectional area of extruding port of 1.11 cm$^2$, a high-density polyethylene (HIZEX 2200J; a product of Mitsui petrochemical Industries Ltd.) having a density of 0.968 g/cm$^3$ and a melt index of 5.5 was spun at a spinning temperature of 165° C. and an extruding line speed of 10.6 cm/min. The spun fiber was cooled with a counter current of air having a temperature of 25° C. and a velocity of 3.0 m/sec, and taken up at a take-up speed of 280 m/min and a spinning draft of 2,667. the resulting undrawn hollow fiber had an inner diameter of 250 µm and a wall thickness of 35 µm.

This unstretched hollow fiber was heat-treated with holding it not to change its length at 125° C. for 25 hours. The eleatic recovery factor of this unstretched hollow fiber was 72%. Subsequently, the annealed hollow fiber was stretched at room temperature with a deformation rate of 160% per second so as to give an amount of stretching of 80%, then stretched by rollers in an oven heated at 120° C. with a deformation rate of 2.0% per second until a total amount of stretching of 800% was attained, and further thermally set in a heated oven for 40 seconds, thereby producing a porous hollow fiber membrane continuously. The resulting porous polyethylene hollow fiber membrane had been stretched 9.0-fold relative to the unstretched hollow fiber, and it had an inner diameter of 240 µm and a wall thickness of 30 μm. Its average pore diameter was 2.1 μm as measured with a mercury porosimeter, its air permeability was $92 \times 10^4$ 1/m$^2$·hr·0.5 atm, and its porosity was 80%. Observation with a scanning electron microscope revealed that there were a countless number of characteristic rectangular pores and the average length of microfibrils was 3.8 μm. Its water penetration pressure was 3.7 kg/cm$^2$ and its water permeability after hydrophilized by using alcohol was 36 1/m$^2$·hr·mmHg.

Using the resulting porous polyethylene hollow fiber membrane having a large pore diameter and a high porosity, a polymer was held thereon under the same conditions as employed in Example 6, except that a treating solution composed of 100 parts of diacetone acrylamide, 5 parts of N-hydroxymethylacrylamide, 10 parts of benzoyl peroxide, and 330 parts of methyl ethyl ketone was used, and the hollow fiber membrane was heat-treated at 60° C. for 60 minutes. The performance of the resulting hydrophilized porous polyethylene hollow fiber membrane was evaluated, and the results thus obtained are shown in Table 1.

When the state of coverage with the hydrophilic crosslinked polymer was observed, it was found that polymer was almost uniformly held over substantially the entire wall surfaces of the pores. Moreover, the measurements of cumulative dissolution revealed that essentially no component dissolved out after 24 hours.

EXAMPLES 12–14

A series of polymers were separately held on porous polyethylene hollow fiber membranes under the same conditions as employed in Example 11, except that N-hydroxymethylacrylamide was used as the crosslinkable monomer in the respective amounts shown in Table 1.

The performance of the resulting hydrophilized porous polyethylene hollow fiber membranes was evaluated, and the results thus obtained are shown in Table 1.

EXAMPLE 15

A polymer was held on a porous polyethylene hollow fiber membrane under the same conditions as employed in Example 6, except that 5 parts of triallyl isocyanurate was used as the crosslinkable monomer.

The performance of the resulting hydrophilized porous polyethylene hollow fiber membrane was evaluated, and the results thus obtained are shown in Table 1. When the state of coverage with the hydrophilic crosslinked polymer was observed, it was found that the polymer was almost uniformly held over substantially the entire wall surfaces of the pores.

EXAMPLE 16

A polymer was held on a porous polyethylene hollow fiber membrane under the same conditions as employed in Example 6, except that a solution composed of 100 parts of diacetone acrylamide, 1 part of divinylbenzene, 0.3 part of benzoyl peroxide, and 450 parts of methyl ethyl ketone was used, the hollow fiber membrane was soaked therein for 3 seconds, and the thermal polyemrization was carried out at 70° C. for 60 minutes.

The performance of the resulting hydrophilized porous polyethylene hollow fiber membrane was evaluated, and the results thus obtained are shown in Table 1. when the state of coverage with the hydrophilic crosslinked polymer was observed, it was found that polymer was almost uniformly held over substantially the entire wall surfaces of the pores. Moreover, the measurements of cumulative dissolution revealed that essentially no component dissolved out after 24 hours.

EXAMPLE 17–20

Using a hollow fiber-forming spinneret having an extruding port diameter of 16 mm, an annular slit width of 2.5 mm, and a cross-sectional area of extruding port of 1.06 cm$^2$, a high-density polyethylene (NOVATEC BU 004U; a product of Mitsubishi Kasei Corporation) having a density of 0.969 g/cm$^3$ and a melt index of 0.35 was spun at a spinning temperature of 230° C. and an extrusion line speed of 28.0 cm/min. The spun hollow fiber was cooled with a counter current of air having a temperature of 25° C. and a velocity of 4.0 m/sec, and taken up at a take-up speed of 50 m/min and a spinning draft of 179. The resulting unstretched hollow fiber had an inner diameter of 585 um and a wall thickness of 168 μm.

This unstretched hollow fiber was heat-treated with holding it not to change its length at 125° C. for 24 hours. The elastic recovery factor of this unstretched hollow fiber was 74%. Subsequently, the heat-treated hollow fiber was stretched by 140% at room temperature with a deformation rate of 180% per second, then stretched by rollers in a oven heated at 120° C. with a deformation rate of 2.6% per second, and further thermally set under relaxed conditioned in a oven heated at 118° C. so as to give a total amount of stretching of 1,900%, thereby producing a porous hollow fiber membrane continuously. The resulting porous polyethylene hollow fiber membrane had been stretched 20-fold relative to the unstretched hollow fiber, and it had an inner diameter of 475 μm and a wall thickness of 130 μm. Its average pore diameter was 5.1 μm as measured with a mercury porosimeter, its air permeability was $290 \times 10^4$ 1/m$^2$·hr·0.5 atm, and its porosity was 89%. Observation with a scanning electron microscope revealed that there were a countless number of characteristic rectangular pores and the average length of microfibriles was 11.5 μm.

The resulting porous polyethylene hollow fiber membrane having a large pore diameter and a high porosity was continuously fed at a speed of 2 m/min through a solution tank having a length of 10 cm, in which the hollow fiber was subjected to a soaking treatment. Then, in a first pipe having a diameter of 2 cm and a length of 4 m, the attached solution was removed and the hollow fiber membrane was dried. Thereafter, in a second pipe having a diameter of 2 cm and a length of 3 m, the hollow fiber membrane was heated to polymerize the monomers.

Four types of solutions were used separately. Each of them was composed of 100 parts of diacetone acrylamide, N-hydroxymethylacrylamide used in the amount shown in Table 1, 0.5 part of bis(4-tert-butylcyclohexyl) peroxydicarbonate, and 660 parts of acetone. Nitrogen gas at room temperature and hot nitrogen gas at 80° C. were made to flow through the first and second pipes, respectively, both at a flow rate of 3 1/min.

Subsequently, the porous polyethylene hollow fiber membrane was washed by passing it through a 50 cm long tank filled with a 50:50 (by weight) solvent mixture of water and ethanol and then through a 1.5 m long tank overflowing with warm water at 60° C. Thereafter, the hollow fiber membrane was dried in an atmosphere of hot air to obtain a hydrophilized porous polyethylene hollow fiber membrane in accordance with the present invention.

The performance of the resulting hydrophilized porous hollow fiber membranes was evaluated, and the results thus obtained are shown in Table 1. When the state of coverage with the hydrophilic crosslinked polymer was observed, it was found that polymer was almost uniformly held over substantially the entire wall surfaces of the pores of the polyethylene hollow fiber membrane.

TABLE 1

| | Crosslinkable monomer | | Amount of polymer held (wt. %) | Performance of hydrophilized porous hollow fiber membrane | | | | | |
|---|---|---|---|---|---|---|---|---|---|
| | Type | Amount used (parts by weight) | | Water penetration pressure (kg/cm2) | Water permeability (l/m2 · hr · mmHg) | Dissolution (wt %) | | | |
| | | | | | | 1 hr | 24 hr | 200 hr | 800 hr |
| Example 6 | A | 5 | 32.1 | 0.1 | 57 | 0.035 | 0.045 | 0.045 | 0.045 |
| Example 7 | " | 15 | 34.0 | 0.1 | 56 | 0.032 | 0.042 | 0.042 | 0.042 |
| Example 8 | " | 80 | 34.2 | 0.1 | 54 | 0.028 | 0.028 | 0.032 | 0.032 |
| Example 9 | " | 0.5 | 30.3 | 0.1 | 54 | 0.062 | 0.088 | 0.104 | 0.104 |
| Example 10 | B | 5 | 26.2 | 0.1 | 55 | 0.038 | 0.048 | 0.048 | — |
| Example 11 | A | 5 | 25.1 | 0.1 | 38 | 0.027 | 0.031 | 0.031 | — |
| Example 12 | " | 15 | 27.4 | 0.2 | 36 | 0.023 | 0.026 | 0.026 | — |
| Example 13 | " | 80 | 27.7 | 0.3 | 34 | 0.021 | 0.025 | 0.025 | — |
| Example 14 | " | 0.5 | 23.9 | 0.1 | 37 | 0.032 | 0.045 | 0.062 | — |
| Example 15 | C | 5 | 31.5 | 0.2 | 50 | 0.036 | 0.046 | 0.046 | 0.046 |
| Example 16 | D | 1 | 30.4 | 0.1 | 52 | 0.032 | 0.043 | 0.043 | — |
| Example 17 | A | 5 | 38.6 | 0.2 | 152 | 0.062 | 0.075 | 0.075 | — |
| Example 18 | A | 15 | 37.4 | 0.2 | 152 | 0.073 | 0.085 | 0.085 | — |
| Example 19 | " | 1 | 37.0 | 0.2 | 146 | 0.060 | 0.070 | 0.072 | — |
| Example 20 | " | 0.5 | 36.8 | 0.2 | 144 | 0.065 | 0.078 | 0.078 | — |

(Note)
A: N-hydroxymethylacrylamide
B: N,N'-methylenebisacrylamide
C: Triallyl isocyanurate
D: Divinylbenzene Since the porous polyethylene hollow fiber membranes of large pore diameter provided by the present invention have a large pore diameter and a high potosity, they are suitable for use in such applications as precision filtration of liquids and air cleaning, and permit the design of very compact modules and systems. Moreover, since they are produced by a melt spinning process using no solvent, they are very clean materials and never contaminate the fluid being filtered.

Furthermore, the hydrophilized porous polyethylene hollow fiber membranes of the present invention have excellent hydrophilicity, exhibit good water permeability without being subjected to a hydrophilizing pretreatment with ethanol or the like, and show no substantial reduction in filtration performance. In addition, the hydrophilic material is firmly held on the pore surfaces, so that the amount of components dissolving out of it is very small. Accordingly, the hydrophilized porous polyethylene hollow fiber membranes of the present invention can also be used in various field of water treatment including hot water treatment, and hence have very high practical value.

We claim:

1. A porous polyethylene hollow fiber membrane of large pore diameter which consists of polyethylene, the hollow fiber membrane having:
   (a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;
   (b) an average pore diameter ranging from greater than 2 μm up to 10 μm as measured with a mercury porosimeter;
   (c) a porosity of 75 to 95%; and
   (d) an air permeability of not less than $8 \times 10^5$ l/m²·hr·0.5 atm.

2. The porous polyethylene hollow fiber membrane of claim 1, wherein the air permeability of the hollow fiber membrane is not less than $9.1 \times 10^5$ l/m²·hr·0.5 atm.

3. A porous polyethylene hollow fiber as claimed in claim 1 wherein the microfibrils have an average length ranging from greater than 3.0 μm up to 15 μm.

4. A porous polyethylene hollow fiber membrane as claimed in claim 1 wherein the polyethylene is a high-density polyethylene having a density of 0.960 g/cm³ or greater.

5. A porous polyethylene hollow fiber membrane as claimed in claim 1 wherein the polyethylene has a melt index of 0.05 to 6.0.

6. A process for the production of a porous polyethylene hollow fiber membrane of large pore diameter, the hollow fiber membrane having:
   (a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;
   (b) an average pore diameter ranging from greater than 2 μm up to 10 μm as measured with a mercury porosimeter;
   (c) a porosity of 75–95%; and
   (d) an air permeability of not less than $8 \times 10^5$ l/m²·hr·0.5 atm, which comprises the steps of:
   melt-spinning polyethylene through a nozzle which forms hollow fibers;
   annealing the resulting unstretched hollow fiber at a temperature of 100°–130° C. for 30 minutes or more;
   cold-stretching the annealed hollow fiber; and then hot-stretching the stretched hollow fiber under conditions such that the deformation rate during hot stretching is not greater than 10% per second, with the total stretching during cold- and hot-stretching ranging from 750–2500%, the said stretching rendering the hollow fiber porous.

7. A process for the production of a porous polyethylene hollow fiber membrane as claimed in claim 6 wherein the melt-spinning temperature is 20° to 150° C. higher than the melting point of the polyethylene.

8. A process for the production of a porous polyethylene hollow fiber membrane as claimed in claim 6 wherein the melt spinning is carried out at a spinning draft of 5 to 5,000.

9. A process for the production of a porous polyethylene hollow fiber membrane as claimed in claim 6 wherein the cold stretching is carried out at temperature of 40° C. or below with a deformation rate of not less than 40% per second.

10. The process of claim 6, wherein the total amount of stretching of the hollow fiber membrane ranges from 1000% to 2500%.

11. The process of claim 10, wherein the total amount of stretching ranges from 1200% to 2500%.

12. A hydrophilized porous polyethylene hollow fiber membrane comprising a porous polyethylene hollow fiber membrane of large pore diameter having a saponification product of an ethylene-vinyl acetate copolymer held on at least a part of the pore surfaces thereof, the porous polyethylene hollow fiber membrane of large pore size having:
    (a) rectangular pores formed by microfibrils that are oriented in the lengthwise direction of the fiber and joint portions that are composed of stacked lamellae, the pores being contiguous with each other from the inner wall surface to the outer wall surface of the hollow fiber membrane to form a stacked, multicellular structure;
    (b) an average pore diameter ranging from greater than 2 $\mu$m up to 10 $\mu$m as measured with a mercury porosineter;
    (c) a porosity of 75 to 95%; and
    (d) an air permeability of not less than $8 \times 10^5$ $l/m^2 \cdot hr \cdot 0.5$ atm.

13. A hydrophilized porous polyethylene hollow fiber membrane as claimed in claim 12 wherein the saponification product of the ethylene-vinyl acetate copolymer is held physically.

14. A hydrophilized porous polyethylene hollow fiber membrane as claimed in claim 12 wherein the ethylene-vinyl acetate copolymer contains not less than 20 mole % of vinyl acetate units.

15. A hydrophilized porous polyethylene hollow fiber membrane as claimed in claim 12 wherein the saponification product of the ethylene-vinyl acetate copolymer is an ethylene-vinyl alcohol copolymer.

16. A hdyrophilized porous polyethylene hollow fiber membrane as claimed in claim 15 wherein the ethylene-vinyl alcohol copolymer contains 5 to 60% by weight of ethylene units.

17. A hdyrophilized porous polyethylene hollow fiber membrane comprising a porous polyethylene hollow fiber membrane of large pore diameter having a hydrophilic crosslinked polymer held on at least a part of the pore surfaces thereof, the hydrophilic crosslinked polymer being formed by polymerizing monomers including diacetone acrylamide and a crosslinkable monomer, the porous polyethylene hollow fiber membrane of large pore size having:
    (a) rectangular pores formed by microfibrils that are oriented in the lengthwise direction of the fiber and joint portions that are compsoed of stacked lamellae, the pores being contiguous with each other from the inner wall surface to the outer wall surface of the hollow fiber membrane to form a stacked, multicellular structure;
    (b) an average pore diameter ranging from greater than 2 $\mu$m as measured with a mercury porosimeter;
    (c) a porosity of 75 to 95%; and
    (d) an air permeability of not less than $8 \times 10^5$ $l/m^2 \cdot hr \cdot 0.5$ atm.

18. A hydrophilized porous polyethylene hollow fiber membrane as claimed in claim 17 wherein the hydrophilic crosslinked polymer is held physically.

19. A hydrophilized porous polyethylene hollow fiber membrane as claimed in claim 17 wherein the proportions of the monomers are such that copolymerizable monomers including the crosslinkable monomer are used in an amount of 0.3 to 110 parts by weight per 100 parts by weight of diacetone acrylamide.

20. A hydrophilized porous polyethylene hollow fiber membrane as claimed in claim 17 wherein the crosslinkable monomer is a water-soluble crosslinkable monomer.

21. A hydrophilized porous polyethylene hollow fiber membrane as claimed in claim 17 wherein the hydrophilic crosslinked polymer is held in an amount of 0.1 to 100% by weight based on the porous polyethylene hollow fiber membrane of large pore size.

* * * * *